Figure 1:
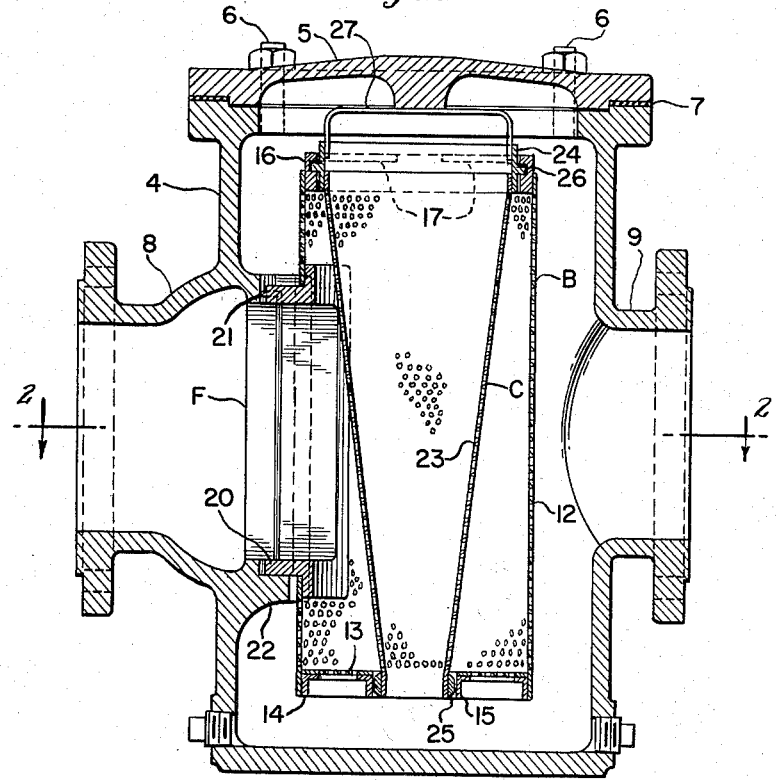

April 20, 1965  D. R. McNEAL  3,179,253
DOUBLE BASKET STRAINER
Filed July 16, 1962

INVENTOR
Daniel Raymond McNeal
BY
Synnestvedt & Lechner
ATTORNEYS

3,179,253
DOUBLE BASKET STRAINER
Daniel Raymond McNeal, Rydal, Pa., assignor to Andale Company, Philadelphia, Pa., a corporation of Pennsylvania
Filed July 16, 1962, Ser. No. 209,990
3 Claims. (Cl. 210—315)

My invention relates to straining equipment and is particularly useful for water supply systems for large industrial plants which draw directly from a river or other source of supply which may contain a considerable amount of rubbish such as sticks, leaves and other debris.

Straining equipment of this character has heretofore generally consisted of a side inlet strainer having a casing with a removable cover, a side inlet for the water to be strained and a side outlet for the strained water. Within the casing is mounted a cylindrical basket or screen having perforated walls and two perforated discs which form the ends of the cylindrical basket. The wall of the basket has an inlet opening in register with the inlet opening of the casing, the periphery of the opening between the casing and the basket being sealed to prevent by-passing of the water into the space between the basket and the casing, thus forcing the water to flow through the basket before passing to the outlet.

This type of strainer is particularly advantageous in many cases for it reduces the over-all height of the strainer and lowers the inlet and outlet points of connection so that it rarely requires any change in the elevation of the line in which it is installed such as is frequently the case when an end inlet basket of the same capacity is used.

The side inlet strainer does, however, have the disadvantage that it is difficult to clean the strainer basket. The side inlet baskets are very heavy and usually have to be lifted from the casing by a crane. The debris which has collected at the bottom of the basket then has to be scooped out in some way, generally by hand through the side inlet of the basket.

It is the object of my invention to provide an arrangement which will retain all the advantages of the side inlet strainer, will eliminate the problems involved in cleaning the debris from the inside of the basket and will provide a more effective straining of the water flowing through the strainer.

I accomplish the objectives by providing a cylindrical basket having an open upper end and a smaller opening centrally located in the lower end of the basket and placing within the cylindrical basket a second screen which is conical and has a collar at each end forming a tight fit within the openings at the ends of the cylindrical basket. (In this specification I will call the outer cylindrical member the "basket" and the inner conical member a "screen," although it will be understood that they may be formed of the same material and have perforations of the same size.)

As the opening at the lower end of the basket is much smaller than the opening at the upper end, the debris will fall between the basket and the screen to the bottom of the basket. When the basket is removed for cleaning, the inner conical screen can be lifted from the basket and the debris can be very easily pushed out of the opening left in the bottom of the basket by the removal of the conical screen.

Figure 2:
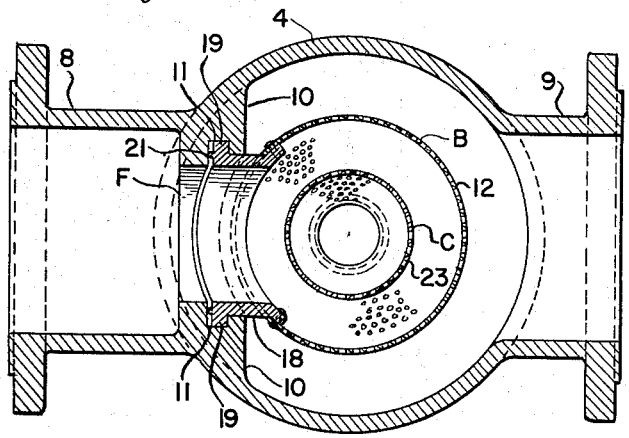
Figure 3:
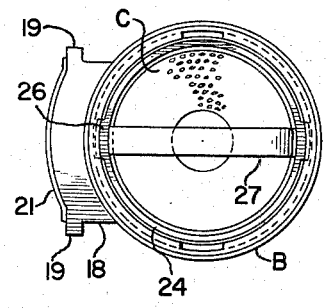

I have illustrated my invention in preferred form in the accompanying drawings wherein FIG. 1 is a sectional elevation through the center of the strainer, FIG. 2 is a section through the strainer taken on the line 2—2 of FIG. 1, and FIG. 3 is a plan view of the strainer.

The strainer comprises a casing 4 having a removable cover 5 secured to the casing 4 by bolts 6. Gasket 7 is interposed between the cover and the casing. The casing is provided with flanged inlet and outlet connections 8 and 9 respectively which are located substantially midway between the top and the bottom of the casing. The inlet opening in the casing is provided with a rectangular frame F which may well consist of a thickened casing wall portion 10 having grooves 11 in the vertical side walls of the frame and a basket supporting projection 22 at the horizontal bottom portion.

The cylindrical basket member B within the strainer is supported in position by the frame F. This basket comprises a cylindrical wall 12 and a bottom wall 13. The basket may be made of perforated sheet metal or other appropriate screening material. The bottom wall 13 is supported by a flanged ring member 14 which may be riveted or welded to the bottom of the cylindrical wall 12 of the basket. The bottom wall 13 is also provided with a central opening surrounded by a flanged collar 15 secured to the under face of the bottom wall.

The upper end of the basket is provided with a ring member 16 secured to the upper end of the wall 12 and having bayonet slots 17 therein.

The basket B is provided with a side inlet opening adapted to register with the inlet opening in the casing. The opening in the basket is surrounded by a rectangular arcuate frame member 18 which may be riveted or welded to the wall 12 of the basket. This frame member 18 is provided with a tongue 19 on either side which is adapted to slide in the grooves 11 of the frame F and a horizontal base portion 20 which rests on the supporting projection 22 of the casing frame and seals the inlet against by-passing of the water across the bottom of the inlet opening. The face of the frame is provided with a narrow bead or filling strip 21 which is in contact with the top and sides of the casing frame F of the casing inlet. This seals the inlet from by-passing of water at the top and sides of the opening. What I have described above is the usual manner of supporting side inlet baskets with screen closed end portions.

As was pointed out above, however, the basket B of my improved strainer has an opening at each end with a conical screen mounted inside the basket. This conical screen is indicated by the letter C. It consists of wall 23, a ring member 24 welded or riveted to the upper end of the wall 23 and a ring member 25 riveted or welded to the lower end of the wall 23. The upper ring has a tongue or bayonet lug portions 26 adapted to fit the slots 17 of the upper ring members 16 of the basket so that when the screen C is rotated, these lugs will engage the upper face of the slots and thus provide a means whereby when the cover 5 is removed, the basket B and the screen C may be lifted from the strainer by the handle 27. The lower ring member 25 of the screen C has a sliding fit within the ring member 15 at the opening at the lower end of the basket B.

It will be understood that the debris which is contained in the water coming in the inlet opening in the side of the basket B will be strained out as the water passes through the walls of the basket B and the screen C and will fall to the bottom of the basket. When the strainer is to be cleaned the cover 5 will be removed. The screen C and basket B will then be lifted from the strainer. The screen C will then be rotated until the bayonet lugs 26 are disengaged from the slot 17 and will then be lifted from the basket B. There will be no tendency for the mesh of the screen to be damaged by dragging it past the debris because as soon as it moves upward the walls of the screen, due to the conical shape, will move away from the accumulated debris. When the screen has been removed from the basket, the debris may be very easily pushed through the exposed opening in the bottom of the basket and the basket and screen reassembled and repositioned in the casing quickly and easily.

Although I have illustrated and described my invention in connection with a strainer for river water wherein the debris which accumulates may contain objects of a rather large size, it will be appreciated that my invention may have other applications for use in connection with side entrance strainers where the liquid passing through the strainer and the material to be strained out is of different character.

I claim:

1. A strainer comprising a casing member having an opening at the top and a removable cover for said opening, an inlet opening for the fluid to be strained at one side of the casing and an outlet opening for the strained fluid, a removable cylindrical basket strainer member mounted within said casing having a side inlet opening in registration with the inlet opening of the casing, means to seal the edges of the opening between the casing and basket, an open-end conical screen member within the cylindrical basket arranged with its larger end uppermost and fitting within and sealing an opening at the upper-end of the cylindrical basket and with the lower smaller end of said conical screen fitting within and sealing an opening at the lower end of said cylindrical basket, whereby there is provided a space between the lower end of the basket and the screen for the accumulation of debris, said conical screen being readily removable upwardly out of the basket without disturbing the accumulated debris.

2. A strainer comprising a casing member having an opening at the top and a removable cover for said opening, an inlet opening for the fluid to be strained at one side of the casing and an outlet opening for the strained fluid, a removable cylindrical basket strainer member mounted within said casing having a side inlet opening in registration with the inlet opening of the casing, means to seal the edges of the opening between the casing and basket, a conical screen member fitting within the basket, the larger upper-end of said conical screen being removably secured within an opening at the upper end of the cylindrical basket and the lower end of said conical screen having a sliding fit within an opening at the lower end of said cylindrical basket whereby there is provided a space between the lower end of the basket and the screen for the accumulation of debris, said conical screen being readily removable upwardly out of the basket without disturbing the accumulated debris.

3. A strainer comprising a casing member having an opening at the top and a removable cover for said opening, an inlet opening for the fluid to be strained at one side of the casing and an outlet opening for the strained fluid, a removable basket strainer mounted within said casing having a side inlet opening in registration with the inlet opening in the casing, means to seal the edges of the opening between the casing and the basket, said basket also having an opening in the upper end thereof and a smaller opening in the lower end thereof, a conical screen member fitting within said basket with its larger end uppermost, said screen slidably fitting in and extending between the openings in the upper and lower ends of the basket, said conical screen being removable upwardly from said basket to permit discharge of debris through the opening at the lower end when the conical screen is removed.

References Cited by the Examiner

UNITED STATES PATENTS

| | | | |
|---|---|---|---|
| 1,582,450 | 4/26 | Chester | 210—315 X |
| 1,971,733 | 8/34 | Shimer | 210—448 |
| 2,512,394 | 6/50 | Sullivan | 210—447 X |
| 2,792,118 | 5/57 | Kraissl | 210—315 X |

REUBEN FRIEDMAN, *Primary Examiner.*

HERBERT L. MARTIN, *Examiner.*